United States Patent
Kochura et al.

(10) Patent No.: US 11,226,892 B2
(45) Date of Patent: *Jan. 18, 2022

(54) ANALYZING SOFTWARE TEST FAILURES USING NATURAL LANGUAGE PROCESSING AND MACHINE LEARNING

(71) Applicant: International Business Machines Corporation, Armonk, NY (US)

(72) Inventors: Nadiya Kochura, Bolton, MA (US); VinodKumar Raghavan Nair, Westford, MA (US); Donald H. Randall, Jr., Austin, TX (US); Derek M. Reedy, Ayer, MA (US); Timothy B. Snow, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,501

(22) Filed: Oct. 19, 2020

(65) Prior Publication Data
US 2021/0049092 A1    Feb. 18, 2021

Related U.S. Application Data

(63) Continuation of application No. 15/064,148, filed on Mar. 8, 2016, now Pat. No. 10,838,849.

(51) Int. Cl.
*G06F 11/36* (2006.01)
*G06F 40/194* (2020.01)
*G06F 40/279* (2020.01)

(52) U.S. Cl.
CPC ........ *G06F 11/3688* (2013.01); *G06F 40/194* (2020.01); *G06F 40/279* (2020.01)

(58) Field of Classification Search
CPC .............. G06F 11/3688; G06F 40/194; G06F 40/279
See application file for complete search history.

(56) References Cited

U.S. PATENT DOCUMENTS

| | | |
|---|---|---|
| 7,992,040 B2 | 8/2011 | Agarwal et al. |
| 8,745,572 B2 | 6/2014 | Zimmermann et al. |
| 8,990,235 B2 | 3/2015 | King |
| 9,032,371 B2 | 5/2015 | Hansson |

(Continued)

OTHER PUBLICATIONS

Briand, "Novel Applications of Machine Learning in Software Testing", 2008, [Online], pp. 3-10, [Retrieved from internet on Oct. 20, 2021], <https://ieeexplore.ieee.org/stamp/stamp.jsp?arnumber=4601522> (Year: 2008).*

(Continued)

*Primary Examiner* — S. Sough
*Assistant Examiner* — Zengpu Wei
(74) *Attorney, Agent, or Firm* — Cantor Colburn LLP; Brian Welle (57) ABSTRACT

According to an aspect, software test failures are analyzed using natural language processing (NLP) and machine learning. A failure is detected during a code build associated with a software product. Each change set since a last successful code build associated with the software product is identified and analyzed using NLP to extract change set features. A software defect origin model is applied to the extracted features in each analyzed change set to detect an origin of the failure.

20 Claims, 4 Drawing Sheets

(56) References Cited

U.S. PATENT DOCUMENTS

| | | | |
|---|---|---|---|
| 9,134,961 B1* | 9/2015 | Cohen | G06F 9/44505 |
| 9,244,964 B2 | 1/2016 | Bhatt | |
| 9,274,926 B2 | 3/2016 | Larson | |
| 9,355,017 B2 | 5/2016 | Neumeyer | |
| 9,477,749 B2 | 10/2016 | Mathew et al. | |
| 9,542,176 B2 | 1/2017 | Bird | |
| 2010/0218031 A1 | 8/2010 | Agarwal et al. | |
| 2012/0239817 A1 | 9/2012 | Ensing et al. | |
| 2012/0331439 A1 | 12/2012 | Zimmermann | |
| 2013/0311481 A1 | 11/2013 | Bhatt et al. | |
| 2014/0013307 A1 | 1/2014 | Hansson | |
| 2014/0053135 A1 | 2/2014 | Bird et al. | |
| 2014/0331206 A1* | 11/2014 | Abraham | G06F 11/3676 717/124 |
| 2016/0021173 A1 | 1/2016 | Tapia | |
| 2016/0335555 A1 | 11/2016 | Llanes-Tosar et al. | |
| 2017/0262360 A1 | 9/2017 | Kochura et al. | |

OTHER PUBLICATIONS

Li et al., "Analyzing failure mechanism for complex software-intensive systems", [online], 2015, pp. 57-58, [retreived from internet on Jun. 22, 2020.

List of IBM Patents or Patent Applictions Treated as Related; (Appendix P), Filed Oct. 19, 2020, 2 pages.

Ozarin et al., "A Process for Failure Modes and Effects Analysis of Computer Software", [online], 2003, pp. 365-370 [retreived from internet on Jun. 22, 2020].

Sukkerd et al., "Understanding Regression Failures through Test-Passing and Test-Failing Code Changes", [online], 2013 pp. 1177-1180 [retreived from internet on Jun. 22, 2020].

* cited by examiner

ANALYZING SOFTWARE TEST FAILURES USING NATURAL LANGUAGE PROCESSING AND MACHINE LEARNING

DOMESTIC PRIORITY

This application is a continuation of U.S. patent application Ser. No. 15/064,148, filed Mar. 8, 2016, the content of which is incorporated by reference herein in its entirety.

BACKGROUND

The present disclosure generally relates to analyzing software test failures, and more particularly, to analyzing test failures using natural language processing (NLP) and machine learning.

Testing a software product during a development cycle may be challenging. The larger the software product, the more source code to be tested, and the more challenging the testing may become. A software failure may occur during testing due any number of things such as source code changes, requirement changes, and environment changes. Manually determining the root cause of a failure from stack traces may be a time consuming, tedious, and error-prone task.

SUMMARY

According to an embodiment, a computer-implemented method may include detecting a failure during a code build associated with a software product. The method may also include identifying each change set since a last successful code build associated with the software product. The method may further include analyzing each change set using natural language processing (NLP) to extract change set features. The method may also include applying a software defect origin model to the extracted features in each analyzed change set to detect an origin of the failure.

One or more of the following features may be included. Changes to code of the software product may be tracked in a source control application.

Identifying each change set since the last successful code build may include identifying existing comments and changes in comments associated with each change set since the last successful code build. Identifying each change set since the last successful code build may also include identifying at least one of: chat history associated with the change set, at least one email thread associated with the change set, meeting minutes associated with the change set, and presentation material associated with the change set.

Analyzing each change set using NLP may include converting speech associated with each change set to text. Analyzing each change set using NLP may also include parsing natural language associated with each change set.

The method may also include providing a summary of the origin of the failure to a user with evidence of the origin of the failure.

According to another embodiment, computer program product includes a computer readable storage medium having program instructions embodied therewith. When executed by a processor, the instructions may cause the processor to perform operations including detecting a failure during a code build associated with a software product. Instructions may also be included for identifying each change set since a last successful code build associated with the software product. NLP instructions may also be included for analyzing each change set using NLP to extract change set features. Instructions may further include applying a software defect origin model to the extracted features in each analyzed change set to detect an origin of the failure.

One or more of the following features may be included.
Changes to code of the software product may be tracked in a source control application.

Instructions for identifying each change set since the last successful code build may include instructions for identifying existing comments and changes in comments associated with each change set since the last successful code build. Instructions for identifying each change set since the last successful code build may also include instructions for identifying at least one of: chat history associated with the change set, at least one email thread associated with the change set, meeting minutes associated with the change set, and presentation material associated with the change set.

Instructions for analyzing each change set using NLP may include instructions for converting speech associated with each change set to text. Instructions for analyzing each change set using NLP may also include instructions for parsing natural language associated with each change set.

Instructions may also be included for providing a summary of the origin of the failure to a user with evidence of the origin of the failure.

According to another embodiment, a system may include a memory having computer readable instructions and a processor for executing the computer readable instructions. The computer readable instructions may detect a failure during a code build associated with a software product. The computer readable instructions may also identify each change set since a last successful code build associated with the software product. The computer readable instructions may also analyze each change set using NLP to extract change set features. The computer readable instructions may also apply a software defect origin model to the extracted features in each analyzed change set to detect an origin of the failure.

One or more of the following features may be included.
Changes to code of the software product may be tracked in a source control application.

Identifying each change set since the last successful code build may include identifying existing comments and changes in comments associated with each change set since the last successful code build. Identifying each change set since the last successful code build may also include identifying at least one of: chat history associated with the change set, at least one email thread associated with the change set, meeting minutes associated with the change set, and presentation material associated with the change set.

Analyzing each change set using NLP may include converting speech associated with each change set to text. Analyzing each change set using NLP may also include parsing natural language associated with each change set.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Embodiments described herein are directed to analyzing software test failures using natural language processing (NLP) and machine learning to find root causes of detected failures. Most contemporary computer software languages generate failure or stack traces when code failures occur. However, even when these traces are accompanied with additional messages in a log, it can be difficult for a test engineer or developer/programmer to figure out the root cause of a problem without looking further at the code and/or discussing the detected failure with peers. This can be a time consuming and inexact process. In accordance with embodiments described herein, code changes and related artifacts are analyzed and tracked using a source control system (also referred to herein as "integrated source control system"). Embodiments utilize NLP for processing data related to code changes that have occurred since a last successful code build such as, but not limited to: source code comments, work item comments, chat history, requirement and test tasks related to any change, meeting discussions, email threads, and any sort of natural language conversation which is related to code changes, or conversions. The results of the NLP processing, referred to herein as "change set features" can be input, along with the detected test failure, to a software defect origin model that was previously built using machine learning tools from previously detected defects and their root causes. Output from the software defect origin model can include one or more possible origins of the current defect.

Software test failures can occur for numerous reasons such as, but not limited to: code changes, requirement changes, build failures, and environment changes. There are several commercial tools that are available to automate the testing process, however contemporary tools do not allow for the ability to automatically investigate a detected failure in order to pinpoint the cause of the failure (including the code or requirement that caused the changes). Contemporary tools can utilize call stacks that are included in the logs, however this is often not enough to trace back to an exact change set that caused the failure, since changes in one area of the code can affect code in another area. Currently, a manual process is used to trace a defect from a call stack to a change set, and this is often achieved through the tedious process of backing out likely culprits and re-running the tests to see which change, or change set, caused the error.

Embodiments described herein can be used to automate this manual process by automatically investigating change sets that contributed to a build, call stacks, and other information in the logs. This information can also include unstructured data related to the change sets (e.g., requirements, code comments, related emails or wikis, and the like) which have been parsed by a NLP parser to extract features of the change set. The information can be input to a software defect origin model to trace back to the origin of the current defect.

Figure 1:
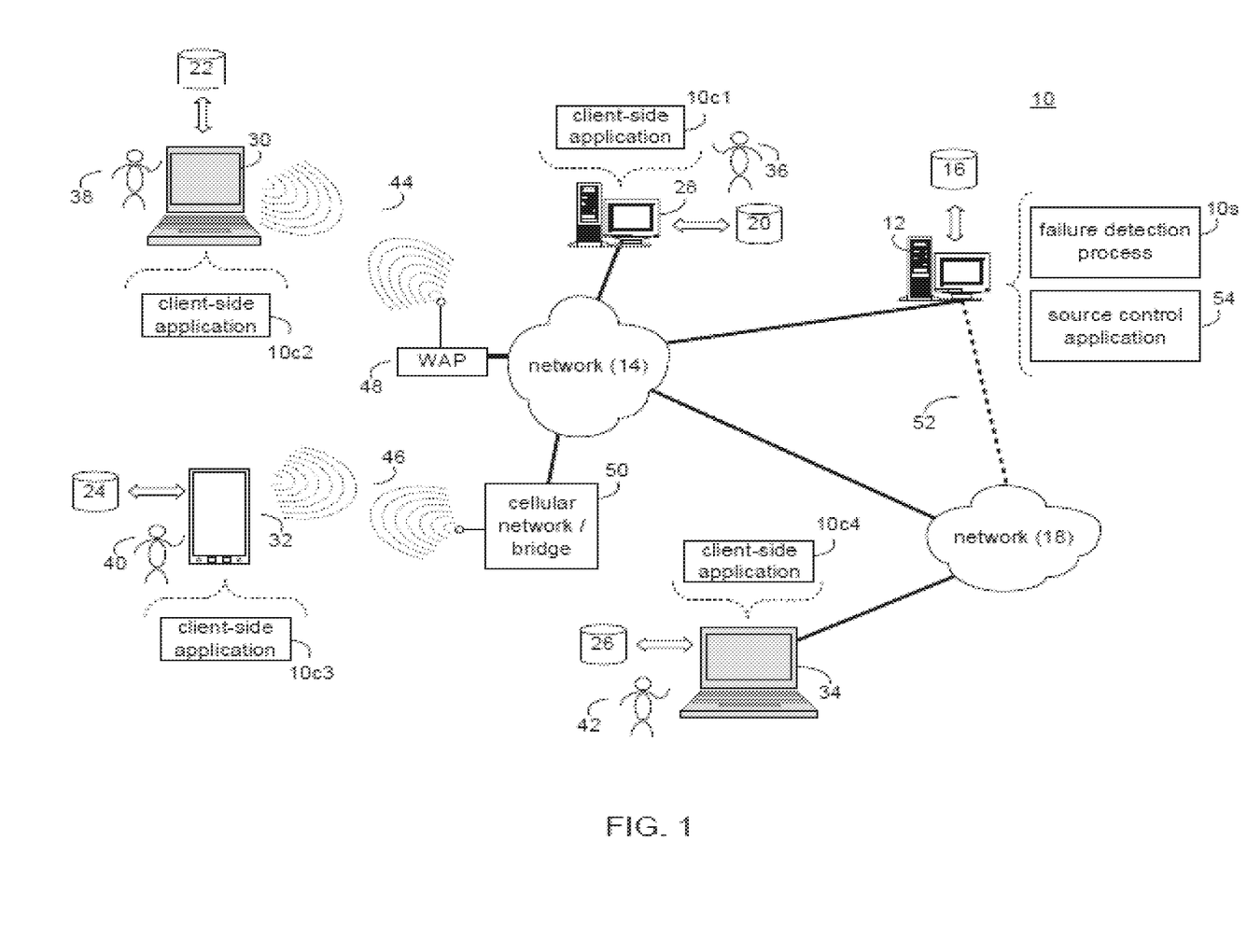
FIG. 1 is a diagrammatic view of a distributed computing network including a computing device that executes a failure analysis process in accordance with one or more embodiments.

Referring to FIG. 1, there is shown failure analysis process 10 for analyzing test failures using NLP and machine learning. For the following discussion, it is intended to be understood that failure analysis process 10 may be implemented in a variety of ways. For example, failure analysis process 10 may be implemented as a server-side process, a client-side process, or a server-side/client-side process.

For example, failure analysis process 10 may be implemented as a purely server-side process via failure analysis process 10s. Alternatively, failure analysis process 10 may be implemented as a purely client-side process via one or more of client-side application 10c1, client-side application 10c2, client-side application 10c3, and client-side application 10c4. Alternatively still, failure analysis process 10 may be implemented as a server-side/client-side process via failure analysis process 10s in combination with one or more of client-side application 10c1, client-side application 10c2, client-side application 10c3, and client-side application 10c4. In such an example, at least a portion of the functionality of failure analysis process 10 may be performed by failure analysis process 10s and at least a portion of the functionality of failure analysis process 10 may be performed by one or more of client-side application 10c1, 10c2, 10c3, and 10c3.

Accordingly, failure analysis process 10 as used in this disclosure may include any combination of failure analysis process 10s, client-side application 10c1, client-side application 10c2, client-side application 10c3, and client-side application 10c4.

Figure 2:
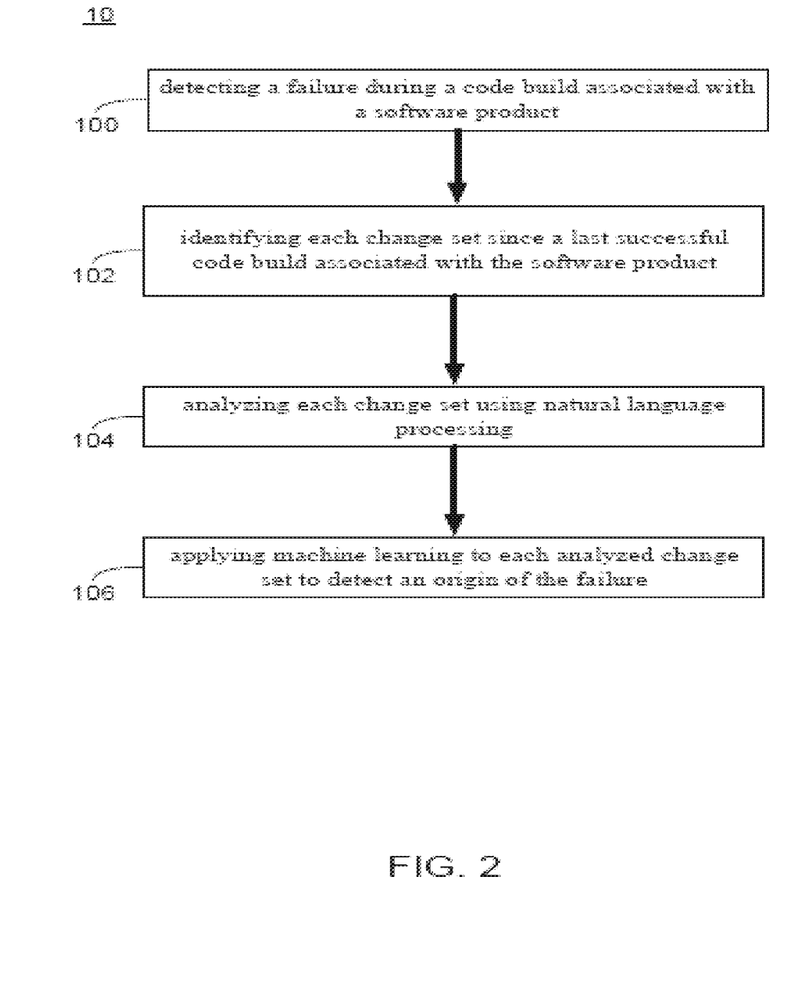
FIG. 2 is a flowchart of the failure analysis process of FIG. 1, in accordance with one or more embodiments.

Referring also to FIG. 2, and as will be discussed in greater detail below, failure analysis process 10 may detect 100 a failure during a code build associated with a software product. Failure analysis process 10 may also identify 102 each change set since a last successful code build associated with the software product. Failure analysis process 10 may also analyze 104 each change set using NLP. Failure analysis process 10 may further apply 106 a model built based on machine learning to each analyzed change set to detect an origin of the failure.

Failure analysis process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of failure analysis process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access failure analysis process 10 directly through network 14 or through secondary network 18. Further, failure analysis process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 44 established between laptop computer 30 and wireless access point (WAP) 48. Similarly, mobile computing device 32 is shown wirelessly coupled to network 14 via wireless communication channel 46 established between mobile computing device 32 and cellular network/bridge 50, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 44 between laptop computer 30 and WAP 48. Additionally, personal computer 34 is shown directly coupled to network 18 via a hardwired network connection.

In some embodiments, failure analysis process 10 may communicate with, interact with, and/or include a component or module of a source control or software version control application (e.g., source control application 54). As is generally known, a source control application (e.g., source control application 54) may generally manage and track changes to software source code. Various changes made to the software source code may be identified and tracked, such that each revision or change to the software source code may be identified. As such, source control application 54 may document and identify changes or revisions that are made to the source code of one or more software products, a date and time the changes were made, the nature or impact of such changes within each source file, identification of the source code that was changed, the developer who made each change, as well as various other information. As such, changes to the software (e.g., to the software source code) that take place over time may be documented using source control application 54. Various information in addition to source code changes or revisions, may also be documented or tracked by, or using, source control application 54. In an embodiment, the data associated with, generated by, and/or collected by source control application 54 may be stored, e.g., on storage device 16 associated with server computer 12, which executes source control application, and/or another suitable storage device. In an embodiment, the source control application 54 is implemented using Rational Team Concert™ from IBM.

As generally discussed above with reference to FIG. 2, failure analysis process 10 may detect 100 a failure during a code build associated with a software product. Failure analysis process 10 may also identify 102 each change set since a last successful code build associated with the software product. Failure analysis process 10 may also analyze 104 each change set using NLP to extract features of the change set. Failure analysis process 10 may further apply 106 a software defect origin model to the extracted features in each analyzed change set to detect an origin of the failure. In an embodiment, the software defect origin model reflects machine learning that was applied to previously detected failures and their corresponding features and origins.

Failure analysis process 10 may detect 100 a failure during a code build associated with a software product. A software product may consist of numerous source files, each source file including numerous lines of source code. In order to test the software product, a code build may be required. A code build may include converting source code files into standalone software artifacts that may be run on a computer. If a failure occurs during the code build, failure analysis process 10 may detect 100 the failure.

Failure analysis process 10 may identify 102 each change set since a last successful code build associated with the software product. Changes to code (e.g., source code) of the software product may be tracked in a source control application (e.g., source control application 54). As discussed above, any changes or revisions to source code included within the source files of the software product may be tracked in a source control application (e.g., source control application 54). For example, all modifications, revisions, new source files, deleted source files, and so forth may be tracked within source control application 54, including date and time stamps associated with each modification. Based upon historical information associated with each source file stored within source control application 54, failure analysis process 10 may determine when the last successful build was performed. Once determined, failure analysis process 10 may identify 102, via source control application 54, each change set of source code that occurred since the last successful code build. A change set may include source code and source files that are associated with a particular change to one or more aspects of the software product since the last successful build. Failure analysis process 10 may identify 102 one change set or many change sets based upon, at least in part, the number of different aspects of the software product that have been changed.

Failure analysis process 10 may extract any and all information associated with each change set from source control application 54. Information associated with each change set may include, but is not limited to, a date and time the changes were made to each change set, the nature or impact of such changes, the source code that was changed within each source file, the developer who made each change (e.g., a developer name or a developer unique identifier associated with each source code change included within each source file), as well as various other information.

Identifying 102 each change set since the last successful code build may include identifying existing comments and changes in comments associated with each change set since the last successful code build. A comment may be a written annotation embedded within the source code of a source file associated with the software product. Developers may include comments in the source code of the source file to document and describe what changes they are making and why they are making such changes. In addition to tracking changes made to source files, source control application 54 may also track changes to any comments included within the source files and the date and time when each comment was changed.

Identifying 102 each change set since the last successful code build may also include identifying at least one of: chat history associated with the change set, at least one email thread associated with the change set, meeting minutes associated with the change set, and presentation material associated with the change set.

Developers may communicate with one another during software development to discuss the software product. Particularly, developers may discuss what new aspects should be added to the software product, what aspects should be removed, which aspects should be changed or updated, why each aspect of the software product should be added, removed, changed, or updated, and other various items associated with testing and development of the software product. Many of the communications may be documented in a medium including an instant messaging chat history, an email thread, written meeting minutes, presentation materials that may be written and/or recorded on a voice recorder, meeting discussions that may be recorded on a voice recorder, and/or a phone conversation that may be recorded on a voice recorder.

Failure analysis process 10 may search for chat history associated with the change set, at least one email thread associated with the change set, meeting minutes associated with the change set, and presentation material associated with the change set based upon, at least in part, information extracted from source control application 54 associated with each change set. As discussed above, information extracted from source control application 54 associated with each change set may include, but is not limited to, changes or revisions made to the source code of each source file, a date and time the changes were made, the nature or impact of such changes, identification of the source code that was changed within each source file, and the developer who made each change. For example, if a source file was updated since the last successful code build, any and all information associated with the changed source file, including a date and time of the change and the name of the developer who made each change, may be extracted from source control application 54. For example, using this information, failure analysis process 10 may search through emails to/from the identified developer who made the change between the time of the last successful build and the time of the change set to search for any emails associated with the change set. Failure analysis process 10 may determine, via a calendar application (not shown), which meetings the identified developer attended between the time of the last successful build and the time of the change set. Failure analysis process 10 may further search for any presentation materials associated with each meeting that the identified developer attended. In a similar manner, failure analysis process 10 may search for instant messaging chat history, documents, work items, meeting minutes, and/or voice recordings that may have been created by the identified developer and/or involved the developer between the time of the last successful build and the time of the change set. While chat history, email threads, meeting minutes, and presentation materials are used as examples herein, any form of documented communication associated with each change set may be identified by failure analysis process 10 including, but not limited to, technical support phone calls, bug tracking entries, environmental settings, and configuration settings. Failure analysis process 10 may collect all information associated with each change set.

In embodiments, when it is not possible to determine up front whether particular data is relevant to a change set, the data is sent to NLP and the model built based on machine learning to handle the process of deciding relevance. NLP can be used to extract semantic features from the information in standard ways, such as, but not limited to: relationship extraction, summarization, parsing, and entity detection. Embodiments described herein can implement processing similar to that used by the Question Analysis portions of IBM Watson™.

Failure analysis process 10 may analyze 104 each change set using NLP. Failure analysis process 10 may use NLP to derive meaning from all, or a portion, of the collected information associated with each change set.

For each identified 102 change set, including information extracted from source control application 54 associated with each change set, existing comments and changes in comments associated with each change set, chat history associated with each change set, at least one email thread associated with each change set, meeting minutes associated with each change set, and presentation materials associated with each change set, failure analysis process 10 may use NLP to determine the meaning of the information included within the existing comments, changes in comments, chat history, email thread, meeting minutes, presentation materials, etc. The semantic features extracted by the NLP can be fed to a software defect origin model, built using standard machine learning algorithms, in order to determine the significance (e.g., the "meaning" of the various features extracted from the change set data.

Analyzing 104 each change sets using NLP may include converting speech associated with each change set to text. For example, a recording of a presentation associated with a change set may be identified 104. Failure analysis process may convert the speech from the recording of the presentation to text. Further, a recording of a telephone call associated with the change set may be identified 104. Failure analysis process may convert the speech from the recording of the telephone call to text. While converting speech to text is described herein, this is not meant to be a limitation of this disclosure. Failure analysis process 10 may also convert text associated with each change set to speech.

Analyzing 104 each change sets using NLP may also include parsing natural language associated with each change set. Parsing natural language may include breaking down the grammatical structure of a sentence.

Breaking down the grammatical structure of a sentence may include determining which words should be grouped together as a phrase based upon, at least in part, keywords, common definitions and/or meaning of the words, etc. Breaking down the grammatical structure of a sentence may further include determining which word(s) of the sentence may be the subject or object of a verb of the sentence. Parsing natural language associated with each change set may include parsing sentences of existing comments and changes in comments associated with each change set, chat history associated with each change set, at least one email thread associated with each change set, meeting minutes associated with each change set, and presentation material associated with each change set to group words together as a phrase, to extract particular nouns or phrases, remove articles from sentences, group common words together, etc.

Failure analysis process 10 may apply 106 machine learning to each analyzed change set to detect an origin of the failure. Failure analysis process 10 may take each analyzed change set and apply 106 a model built based on machine learning by extracting language from the NLP to detect an origin of the code build failure. As failure analysis process 10 analyzes 104 each change set using NLP, including existing comments and changes in comments associated with each change set, chat history associated with each change set, at least one email thread associated with each change set, meeting minutes associated with each change set, and presentation material associated with each change set, failure analysis process 10 may apply 106 a model built based on machine learning to determine what change set(s) may have caused the failure.

Detection of the origin of the failure to the code build may include identification of a location of the origin of the failure (e.g., identification of one or more lines of source code within a particular source file). In this manner, machine learning may improve identification of the root causes of code build failures in an efficient manner.

Failure analysis process 10 may provide a summary of the origin of the failure to a user with evidence of the origin of the failure. The summary may include the cause and description of the failure to alert one or more people as to the root cause of the failure.

Figure 3:
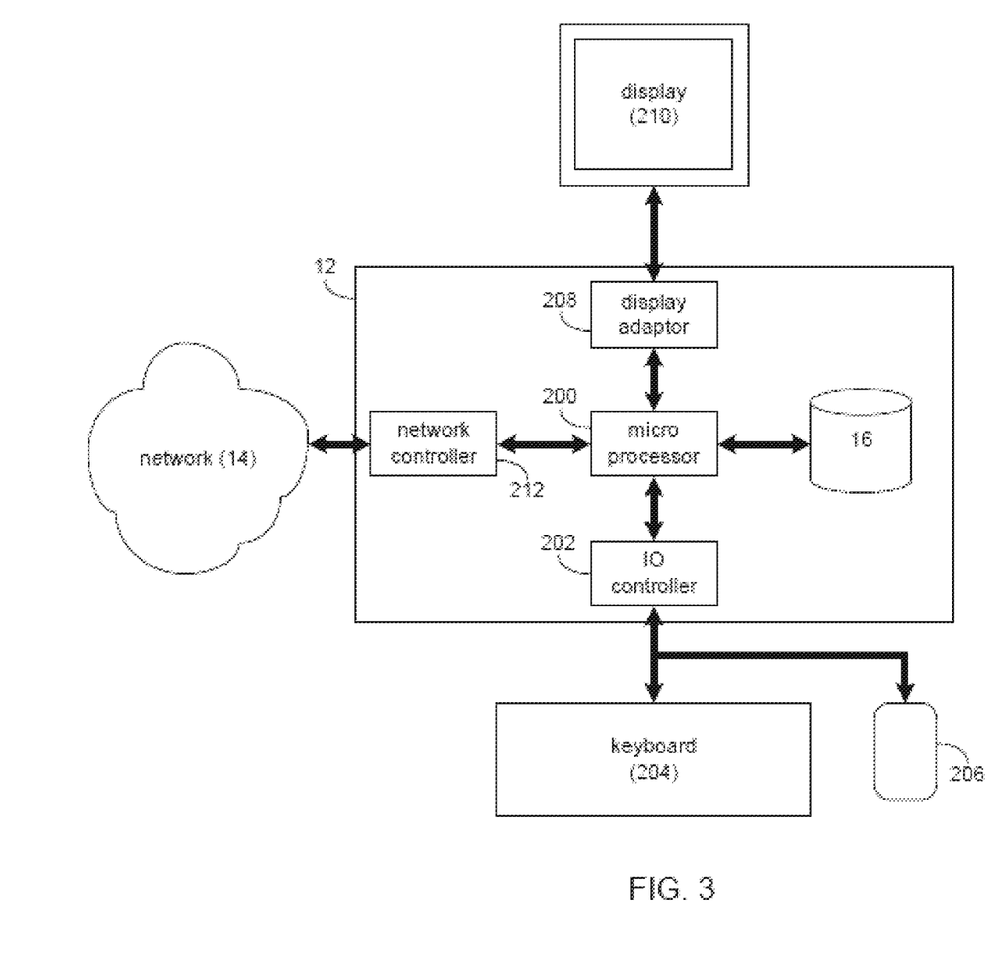
FIG. 3 is a diagrammatic view of the computing device of FIG. 1, in accordance with one or more embodiments.

Referring also to FIG. 3, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, failure analysis process 10 may be substituted for computing device 12 within FIG. 3, examples of which may include but are not limited to client electronic devices 28, 30, 32, 34.

Computing system 12 may include microprocessor 200 configured to e.g., process data and execute instructions/code for failure analysis process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

Figure 4:
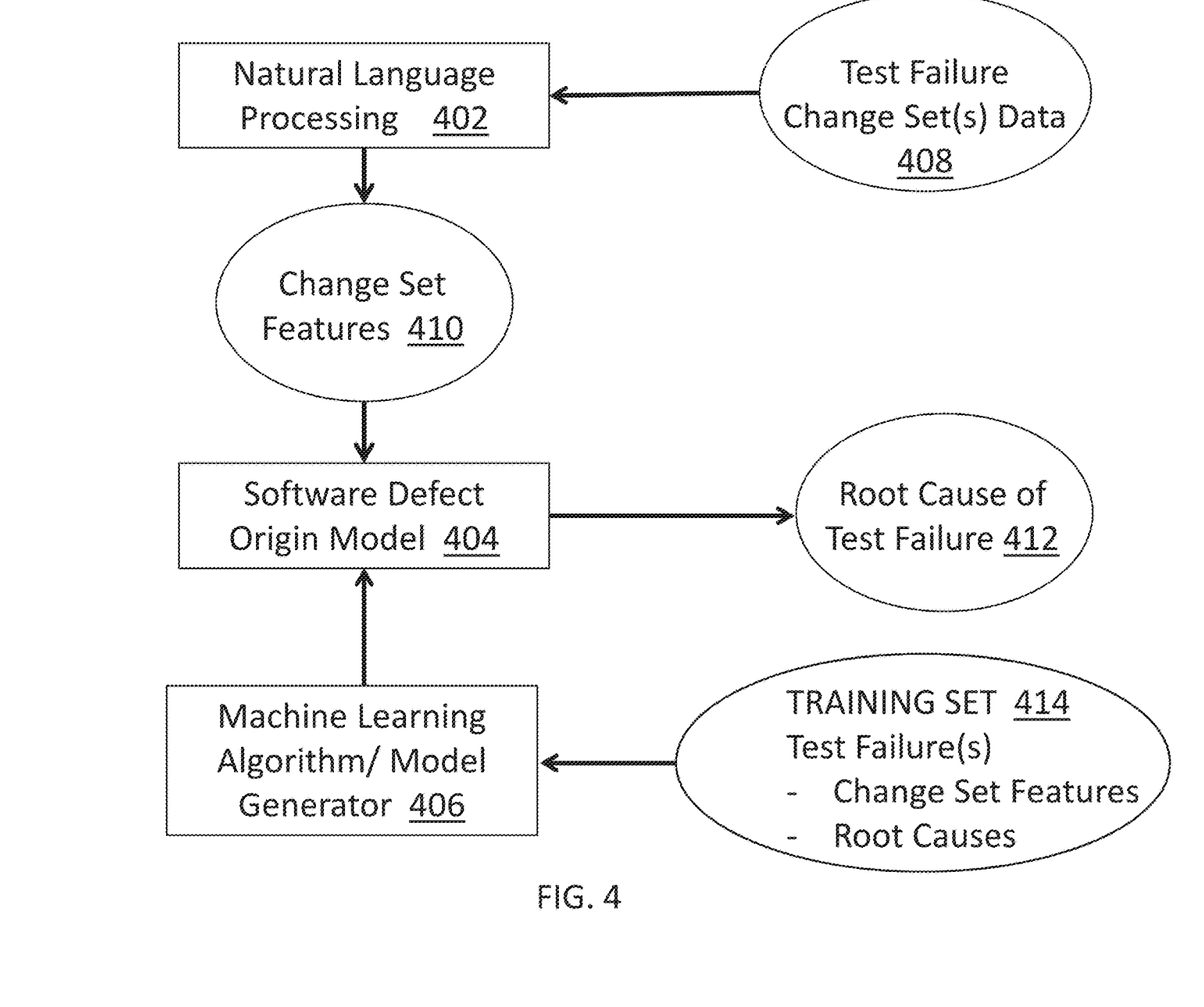
FIG. 4 is a block diagram of a component architecture upon which test failures can be analyzed, in accordance with one or more embodiments.

Turning now to FIG. 4, a block diagram of a component architecture upon which test failures can be analyzed is generally shown, in accordance with one or more embodiments. All or portions of the processing described herein can be implemented using the architecture shown in FIG. 4. The component architecture shown in FIG. 4 includes a natural language processing (NLP) engine 402, a software defect origin model 404, and a machine learning algorithm/model generator 406. The architecture also includes test failure change set data 408, change set features 410, data that indicates a likely root cause of test failure 412, and a training set 414.

As described previously, when a test failure occurs during a code build, one or more change sets since a last successful build are identified. Data related to the change sets, the test failure change set data 408, is input to the NLP engine 402 to generate (or extract) the change set features 410. The change set features 410 are input to the software defect origin model 404 which analyzes the change set features 410 and outputs data that indicates a likely root cause(s) of the test failure 412.

In an embodiment, the test failure change set data 408 is a corpus of data that can include the current build that caused the test failure and associated source code, the 'delta' between the current and previous builds in the form of source code change sets, associated log messages from the execution of automated testing against the build, and any relevant chat logs, email threads, or other natural language data that can be gathered about the current build or previous builds. In embodiments, the corpus of data is scoped to identify data that is possibly related to the detected failure, a process that may be done automatically in some cases (e.g., extraction of structured links to work items or comments in a source control system) or via NLP techniques such as entity detection, relation extraction, and concept identification.

As shown in FIG. 4 and as described previously, the software defect origin model 404 can be built by the machine learning algorithm/model generator 406. Input to the machine learning algorithm/model generator 406 includes the training set 414, which includes data for a plurality of test failures. In an embodiment, each training instance in the training set 414 represents a test failure and includes data identifying the test failure (e.g., an error message), change set features related to the test failure (e.g., manually entered or extracted from change set data using NLP), and a root cause(s) of the test failure. The training set 414 is fed into the machine learning algorithm/model generator 406, yielding the software defect origin model 404 by weighing the various change set features in an effort to decide the relationship between a set of features and their underlying explanation (in this case, a failure). In an embodiment, the software defect origin model 404 describes these relationships mathematically as patterns.

In an embodiment, the software defect origin model 404 is built based on a "ground truth" that includes previous builds with failures and their identified origins. In an embodiment, each of the training instances (the set of all training instances is called the ground truth) can include a particular failure, a work item manually annotated as the cause of said failure, and an associated set of raw data from which features can be extracted. These extracted change set features can be fed into the machine learning algorithm/model generator 406 along with a root cause(s) to train the patterns in the software defect origin model 404.

Thus, when a failure occurs, given the change set features 410 generated by analyzing the data surrounding the build where the failure occurred using the NLP engine 402, as described above, and the software defect origin model 404 created from examining such features in the context of their manually-annotated solutions (the training data of the ground truth), the application of the software defect origin model 404 to the change set features 410 can provide data that indicates a likely root cause of test failure 412, for example, in the form of source code change sets.

An example of how an embodiment can be used to identify likely causes of software test failures follows. In the example, a software product is being produced for a distributed banking application that is currently executing at build "X", which in this example is the last successful code build. When a change to the code base of the software product occurs, a new build "X+1" is produced, regression testing is performed on the new build, and one or more tests in the regression test fail. Embodiments described herein can be used to determine a likely root cause of the failure(s). Test failure change set data 408 can include, but is not limited to: test output data, source control system data, and issue tracker data. Test output data can be generated by a suite of test tools that provide both structured and unstructured output. Examples of test tools include, but are not limited to: Jenkins; and Rational® Functional Tester from IBM. Structured output can include, but is not limited to: test framework results (passes and failures); stack traces; and line references. Unstructured data can include, but is not limited to: log messages; notes; and comments from users.

In the example, automated integrated source control, automated issue tracking, and automated code building/code testing is assumed. When a source code change is made to source control associated with an issue in the issue tracker, the source code is automatically built, the tests are executed, and the results (structured and unstructured) are stored in an accessible database. The source control system data can include, but is not limited to: structured data in the form of source code and change history of source code; and unstructured data in the form of source code comments. Examples of source control systems include, but are not limited to: IBM® Rational Team Concert™; and Git. In an embodiment, the source control system tracks the changes that have occurred, the change set, since a last successful code build. The issue tracker data can include structured data such as, but not limited to, links to changes in source control and links to other issues; as well as unstructured data including, but not limited to comments on issues by users and descriptions of issues written by users. Examples of issue trackers include, but are not limited to: IBM Rational Team Concert; Bugzilla, and Github Issues.

In an embodiment, test failure change set data 408 can be input to the NLP engine 402 to extract change set features 410 for failures related to a particular build. In an embodiment, test failure change set data 408 for a plurality of builds (along with human annotated root causes) is leveraged to train the software defect origin model 404 to recognize patterns that are typically associated with particular root causes of failure.

In order to utilize the test failure change set data 408 to train the software defect origin model 404, change set features 410 are extracted from the structured and unstructured data described above to input into the machine learning algorithm/model generator 406 as part of the training set 414. Change set features 410 are also extracted from teste failure change set data 408 and input to the software defect origin model 404 in order to determine a likely root cause of one or more failures.

Examples of change set features 410 include, but are not limited to: entities and relationships from comments and descriptions; lines of code and locations of code affected by changes; and names of failed tests. Entities and relationships from comments and descriptions can include changes to the source control system that trigger new builds (and thus may create test failures) which are associated with issues in the source control system and issue tracker. Using NLP techniques, the NLP engine 402 can extract from an issue a set of entities and relationships between these entities. These entities can include, but are not limited to: names of contributors; product features described as being implemented; and relationships between product features to be implemented.

For example, an issue in the issue tracker might indicate that contributor "Steve" has been tasked with implementing a new distribution algorithm for a distributed processing system to decide what work is allocated to the worker nodes in a given deployment. In an embodiment, the NLP engine 402 extracts a set of entities and relationships including, but not limited to: Steve, who is a contributor; distribution algorithm, for the distributed processing system; a distributed processing system, which is a kind of software; and worker nodes, which are controlled by a distributed processing system.

Features relating to lines of code and locations of code affected by changes can be extracted by the NLP engine 402 using a query language based off of the structured data provided in the integrated source control system and issue tracker. An embodiment collects a set of features that can include, but are not limited to: names of classes in which code has been changed from X to X+1; and line numbers of code which have been changed from X to X+1. The issue in the running example can link to a series of source code change sets affecting a class named "JobSprayer" lines 43-98, "WorkerNode" lines 80-110, and "Master", lines 23-29. An embodiment extracts change set features 410 including, but not limited to: Class Name "JobSprayer"; Class Name "WorkerNode"; Class Name "Master"; line numbers 43-98 in JobSprayer; line numbers 80-110 in WorkerNode; and line numbers 23-29 in Master.

Features relating to names of failed tests can be extracted by the NLP engine 402 using a provided query language based off of the structured data provided by the execution of the test suite. An embodiment collects a set of features that include but are not limited to: names of tests that have failed in the testing of build X+1; nature of tests that have failed (unit tests, integration tests, etc.) in the testing of build X+1; names of tests that have passed in the testing of build X+1; suite names of tests that have failed and passed in the testing of build X+1; stack traces from failed tests in the testing of build X+1; and log messages output by tests run against build X+1 (these may require NLP).

For example, upon completion of testing against the changes delivered by Steve in the running example, tests "CheckForLostData", "CheckForFullWorkerLoad", and "VerifyFinalAnswer" have failed, while tests "CheckAllWorkersAreUp", "VerifyCorrectInput", and "VerifyJobRan" passed. In addition, the log messages from "VerifyFinalAnswer" include the line "FAIL: the incorrect answer was generated by the system, for query "What is 2+2", expected "4" but got "5"." In addition, the log messages from "CheckForFullWorkerLoad" include a stack trace mentioning an exception from class WorkerNode, Line 90. Based on this data, an embodiment of the system can collect features that include, but are not limited to: test names "CheckForLostData", "CheckForFullWorkerLoad", "VerifyFinalAnswer" failed; test names "CheckAllWorkersAreUp", "VerifyCorrectInput", "VerifyJobRan" passed; and entities "Incorrect Answer", "Query=2+2", "expected=4", "actual answer=5".

In an embodiment, a similar process is used to extract features for a collected set of previous failures and associated data that have been annotated by human domain experts to identify a cause of failure. This set of examples of features and corresponding root failure causes are used as part of the training set 414 as input to the machine learning algorithm/model generator 406 to generate a software defect origin model 404 that analyzes new instances of failure. A root cause of test failure 412 can include semantic, human comprehension of the behavior of the code base. In the running example, it may be that these features are symptoms of a root cause of failure such as "There is a race condition in the worker nodes reporting results." Other kinds of root causes may include, but are not limited to: "Null pointer exception in allocation code"; "Null pointer exception in garbage collection code"; "Login code is not correctly authenticating user"; "Balance calculations are not including recent transactions"; and "Offsite heartbeat server is offline."

In the training set 414, the example failure instances form 'clusters' around their human-annotated root causes. For example, there might be 200 different sets of collected failure data that have been annotated with the root cause of "Null pointer exception in allocation code", and 400 different sets of collected failure data that have been annotated with the root cause of "Balance calculations are not including recent transactions." From this, a mathematical model can be built. The model is a mapping of the statistical relevance of the described features to the output given to it in training. The more data that is in the training set 414, the better the software defect origin model 404 can predict the root cause of test failure 412, due to being able to recognize the different patterns associated with different root causes. When a new issue comes in, as test failure change set data 408, the software defect origin model 404 can analyze the pattern(s) of the features extracted from the new issue and compare it with the mathematical description of the patterns it has learned from the features in the training set 414, and then make a determination of the most likely cause for the failure.

For example, the software defect origin model 404 might find that the new issue was a null pointer crash in the balance calculator, and the system sees from the training set 414 that Steve and John often cause null pointer errors, but crashes are typically in the C code and only Steve works in the C code in the balance calculator. Thus, in this example, the model would choose the change set from Steve in the C code of the balance calculator as the most likely root cause of text failure 412. This example is overly simplistic for illustrative purposes as there can be hundreds of features, however it illustrates one way in which this system could be implemented. The root cause of test failure 412 can be broad in nature, including, but not limited to: functional failures, technical failures, business logic failures, and infrastructure failures; any kind of cause of failure that has been identified in previous iterations can be included in the training set 414 to provide maximum insight on future data.

Embodiments described herein include a system that can be trained to determine what the most likely cause of a particular failure in a software project is, thus accelerating the defect analysis, triaging, and assignment process. Currently, in contemporary systems, even with highly granular and high-coverage test suites, this process can require a lot of top-down, full-stack expertise on the behalf of test maintainers, and often includes a somewhat tedious and time-consuming process of trial-and-error code changes and change set reversion until a test passes. By utilizing embodiments described herein, this process can be heavily automated, increasing the overall maximum velocity of code development while requiring less heavy allocation of testing resources to a given project.

Technical effects and benefits include the ability to automate the determination of a root cause for a software test failure. In end-to-end tests (e.g., a unit integration test), knowledge of the system as a whole and the specific changes in particular is required to manually determine root causes of test failures, and often trial and error (e.g. removing a change set and seeing whether it passes) is the method that is utilized. The ability to automate this process can result in both saving time during the test phase and improving accuracy in determining root causes of test failures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   detecting, by a processor, a failure during a code build associated with a software product;
   identifying, by the processor, each change set since a last successful code build associated with the software product, each change set comprising source code and a source file;
   identifying, by the processor, data related to each change set;
   analyzing, by the processor, each change set and the data related to each change set using natural language processing (NLP) to extract change set features;
   applying, by the processor, a software defect origin model to the extracted features in each analyzed change set to detect an origin of the failure;
   the software defect origin model trained using a training set that comprises a plurality of training instances, each training instance representing a test failure and comprising training instance data identifying the test failure, training instance change set features related to the test failure, and a training instance origin of the test failure including a work item identified as causing the test failure, the training comprising weighing the training instance change set features of the training instances to determine a relationship between one or more of the training instance change set features and each of the test failures, wherein each of the relationships are described mathematically, and
   the origin of the failure comprising an identification of one or more lines of source code within a source file of a change set included in the at least one change set since a last successful code build.

2. The computer-implemented method of claim 1, wherein changes to code of the software product are tracked in a source control application.

3. The computer-implemented method of claim 1, wherein the data related to at least one change set comprises existing comments and changes in comments associated with each change set since the last successful code build.

4. The computer-implemented method of claim 1, wherein the data related to the at least one change set comprises at least one of: an email thread associated with the change set, meeting minutes associated with the change set, and presentation material associated with the change set.

5. The computer-implemented method of claim 1, wherein analyzing each change set using NLP includes converting speech associated with each change set to text.

6. The computer-implemented method of claim 1, wherein analyzing each change set using NLP includes parsing natural language associated with each change set.

7. The computer-implemented method of claim 1, further including:
providing a summary of the origin of the failure to a user with evidence of the origin of the failure.

8. A computer program product comprising a computer readable storage medium having program instructions embodied therewith, the program instructions executable by a processor to cause the computer processor to perform:
detecting a failure during a code build associated with a software product;
identifying each change set since a last successful code build associated with the software product, each change set comprising source code and a source file;
identifying data related to each change set;
analyzing each change set and the data related to each change set using natural language processing (NLP) to extract change set features; and
applying a software defect origin model to the extracted features in each analyzed change set to detect an origin of the failure,
the software defect origin model trained using a training set that comprises a plurality of training instances, each training instance representing a test failure and comprising training instance data identifying the test failure, training instance change set features related to the test failure, and a training instance origin of the test failure including a work item identified as causing the test failure, the training comprising weighing the training instance change set features of the training instances to determine a relationship between one or more of the training instance change set features and each of the test failures, wherein each of the relationships are described mathematically, and
the origin of the failure comprising an identification of one or more lines of source code within a source file of a change set included in the at least one change set since a last successful code build.

9. The computer program product of claim 8, wherein changes to code of the software product are tracked in a source control application.

10. The computer program product of claim 8, wherein the data related to at least one change set comprises existing comments and changes in comments associated with each change set since the last successful code build.

11. The computer program product of claim 8, wherein the data related to at least one change set comprises at least one of: an email thread associated with the change set, meeting minutes associated with the change set, and presentation material associated with the change set.

12. The computer program product of claim 8, wherein analyzing each change set using NLP includes converting speech associated with each change set to text.

13. The computer program product of claim 8, wherein analyzing each change set using NLP includes parsing natural language associated with each change set.

14. The computer program product of claim 8, wherein the program instructions further cause the computer processor to perform:
providing a summary of the origin of the failure to a user with evidence of the origin of the failure.

15. A system comprising:
a memory having computer readable instructions; and
a processor for executing the computer readable instructions, the computer readable instructions including:
detecting a failure during a code build associated with a software product;
identifying each change set since a last successful code build associated with the software product, each change set comprising source code and a source file;
identifying data related to each change set;
analyzing each change set and the data related to each change set using natural language processing (NLP) to extract change set features; and
applying a software defect origin model to the extracted features in each analyzed change set to detect an origin of the failure,
the software defect origin model trained using a training set that comprises a plurality of training instances, each training instance representing a test failure and comprising training instance data identifying the test failure, training instance change set features related to the test failure, and a training instance origin of the test failure including a work item identified as causing the test failure, the training comprising weighing the training instance change set features of the training instances to determine a relationship between one or more of the training instance change set features and each of the test failures, wherein each of the relationships are described mathematically, and
the origin of the failure comprising an identification of one or more lines of source code within a source file of a change set included in the at least one change set since a last successful code build.

16. The system of claim 15, wherein changes to code of the software product are tracked in a source control application.

17. The system of claim 15, wherein the data related to at least one change set comprises existing comments and changes in comments associated with each change set since the last successful code build.

18. The system of claim 15, wherein the data related to at least one change set comprises at least one of: an email thread associated with the change set, meeting minutes associated with the change set, and presentation material associated with the change set.

19. The system of claim 15, wherein analyzing each change set using NLP includes converting speech associated with each change set to text.

20. The system of claim 15, wherein analyzing each change set using NLP includes parsing natural language associated with each change set.

* * * * *